(12) United States Patent
Ehrlich

(10) Patent No.: US 7,027,244 B2
(45) Date of Patent: Apr. 11, 2006

(54) SYSTEMS FOR SELF-SERVOWRITING USING WRITE-CURRENT VARIATION

(75) Inventor: Richard M. Ehrlich, Saratoga, CA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 67 days.

(21) Appl. No.: 10/818,473

(22) Filed: Apr. 5, 2004

(65) Prior Publication Data

US 2005/0237646 A1    Oct. 27, 2005

Related U.S. Application Data

(63) Continuation of application No. 10/420,076, filed on Apr. 22, 2003, now abandoned.

(60) Provisional application No. 60/436,712, filed on Dec. 27, 2002.

(51) Int. Cl.
*G11B 5/09* (2006.01)

(52) U.S. Cl. .............................. 360/46; 360/68; 360/75

(58) Field of Classification Search ...................... None
See application file for complete search history.

(56) References Cited

U.S. PATENT DOCUMENTS

| | | | |
|---|---|---|---|
| 5,107,378 A | 4/1992 | Cronch et al. ................. 360/45 |
| 5,966,264 A | 10/1999 | Belser et al. ............. 360/77.08 |
| 6,023,389 A | 2/2000 | Cunningham ................. 360/75 |
| 6,025,970 A | 2/2000 | Cheung .................... 360/77.08 |
| 6,101,053 A * | 8/2000 | Takahashi ..................... 360/46 |
| 6,118,614 A * | 9/2000 | Lee .............................. 360/75 |
| 6,198,583 B1 * | 3/2001 | Ohinata et al. ............... 360/46 |
| 6,411,459 B1 | 6/2002 | Belser et al. ................. 360/75 |
| 6,445,521 B1 | 9/2002 | Schaff et al. ................. 360/31 |
| 2002/0135927 A1 | 9/2002 | Yatsu |
| 2003/0072100 A1 * | 4/2003 | Lee et al. ..................... 360/53 |
| 2003/0161061 A1 | 8/2003 | Lamberts |

FOREIGN PATENT DOCUMENTS

| | | |
|---|---|---|
| JP | 61211814 | 9/1986 |
| JP | 63025803 | 2/1988 |
| JP | 10334402 | 12/1998 |

* cited by examiner

*Primary Examiner*—David Hudspeth
*Assistant Examiner*—Dan I Davidson
(74) *Attorney, Agent, or Firm*—Fliesler Meyer LLP

(57) ABSTRACT

In order to account for the misplacement of a write element during a servowriting process, the width of the information being written can be varied. In a self-servowriting disk drive, for example, the write current supplied to a read/write head can be adjusted to vary the width of information, such as servo bursts, written by the head. By calibrating the head and determining the misplacement of the head while writing, an edge of a servo burst can be placed in the desired position regardless of the misplacement of the head simply by adjusting the width of the written burst. This description is not intended to be a complete description of, or limit the scope of, the invention. Other features, aspects, and objects of the invention can be obtained from a review of the specification, the figures, and the claims.

15 Claims, 8 Drawing Sheets

SYSTEMS FOR SELF-SERVOWRITING USING WRITE-CURRENT VARIATION

CLAIM OF PRIORITY

This application is a continuation of U.S. patent application Ser. No. 10/420,076, filed Apr. 22, 2003 now abandoned, which claims benefit from U.S. Provisional Patent Application No. 60/436,712, filed Dec. 27, 2002, both of which are incorporated herein by reference.

CROSS-REFERENCE TO RELATED APPLICATIONS

The following applications are cross-referenced and incorporated herein by reference:

U.S. Provisional Patent Application No. 60/436,703 entitled "Methods for Self-Servowriting Using Write-Current Variation," by Richard M. Ehrlich, filed Dec. 27, 2002.

U.S. patent application Ser. No. 10/420,498 entitled "Methods for Self-Servowriting Using Write-Current Variation," by Richard M. Ehrlich, filed Apr. 22, 2003.

U.S. patent application Ser. No. 10/818,174, entitled "Methods for Self-Servowriting Using Write-Current Variation, "by Richard M. Ehrlich, filed Apr. 5, 2004.

U.S. Provisional Patent Application No. 60/436,709 entitled "Systems for Multi-Pass Self-Servowriting," by Richard M. Ehrlich, filed Dec. 27, 2002.

U.S. Provisional Patent Application No. 60/436,743 entitled "Methods for Multi-Pass Self-Servowriting," by Richard M. Ehrlich, filed Dec. 27, 2002.

U.S. patent application Ser. No. 10/420,452 entitled "Systems for Self-Servowriting With Multiple Passes Per Servowriting Step," by Richard M. Ehrlich, filed Apr. 22, 2003.

U.S. patent application Ser. No. 10/420,127 entitled "Methods for Self-Servowriting With Multiple Passes Per Servowriting Step," by Richard M. Ehrlich, filed Apr. 22, 2003.

U.S. patent application Ser. No. 10/818,181, entitled "Systems for Self-Servowriting With Multiple Passes Per Servowriting Step, "by Richard M. Ehrlick, filed Apr. 5, 2004.

U.S. patent application Ser. No. 10/818,185 entitled "Methods for Self-Servowriting With Multiple Passes Per Servowriting Step, "by Richard M. Ehrlich, filed Apr. 5, 2004.

FIELD OF THE INVENTION

The present invention relates to servowriting processes and devices.

BACKGROUND

Advances in data storage technology have provided for ever-increasing storage capability in devices such as DVD-ROMs, optical drives, and disk drives. In hard disk drives, for example, the width of a written data track has decreased due in part to advances in reading, writing, and positioning technologies. More narrow data tracks result in higher density drives, which is good for the consumer but creates new challenges for drive manufacturers. As the density of the data increases, the tolerance for error in the position of a drive component such as a read/write head decreases. As the position of such a head relative to a data track becomes more important, so too does the placement of information, such as servo data, that is used to determine the position of a head relative to a data track.

BRIEF SUMMARY

Systems and methods in accordance with the present invention take advantage of varying write currents used in servowriting or self-servowriting. A varying write current allows for the removal of misplacement effects by allowing the position of an edge of a piece of written information, such as a servo burst, to be controlled. The misplacement of the edge can be removed by adjusting the width of the written burst such that the edge is located approximately in the intended location. The use of varying write currents reduces the written runout, as the effects of many of the irregularities in head position during self-servowriting can be removed.

Other features, aspects, and objects of the invention can be obtained from a review of the specification, the figures, and the claims.

DETAILED DESCRIPTION

Figure 1:
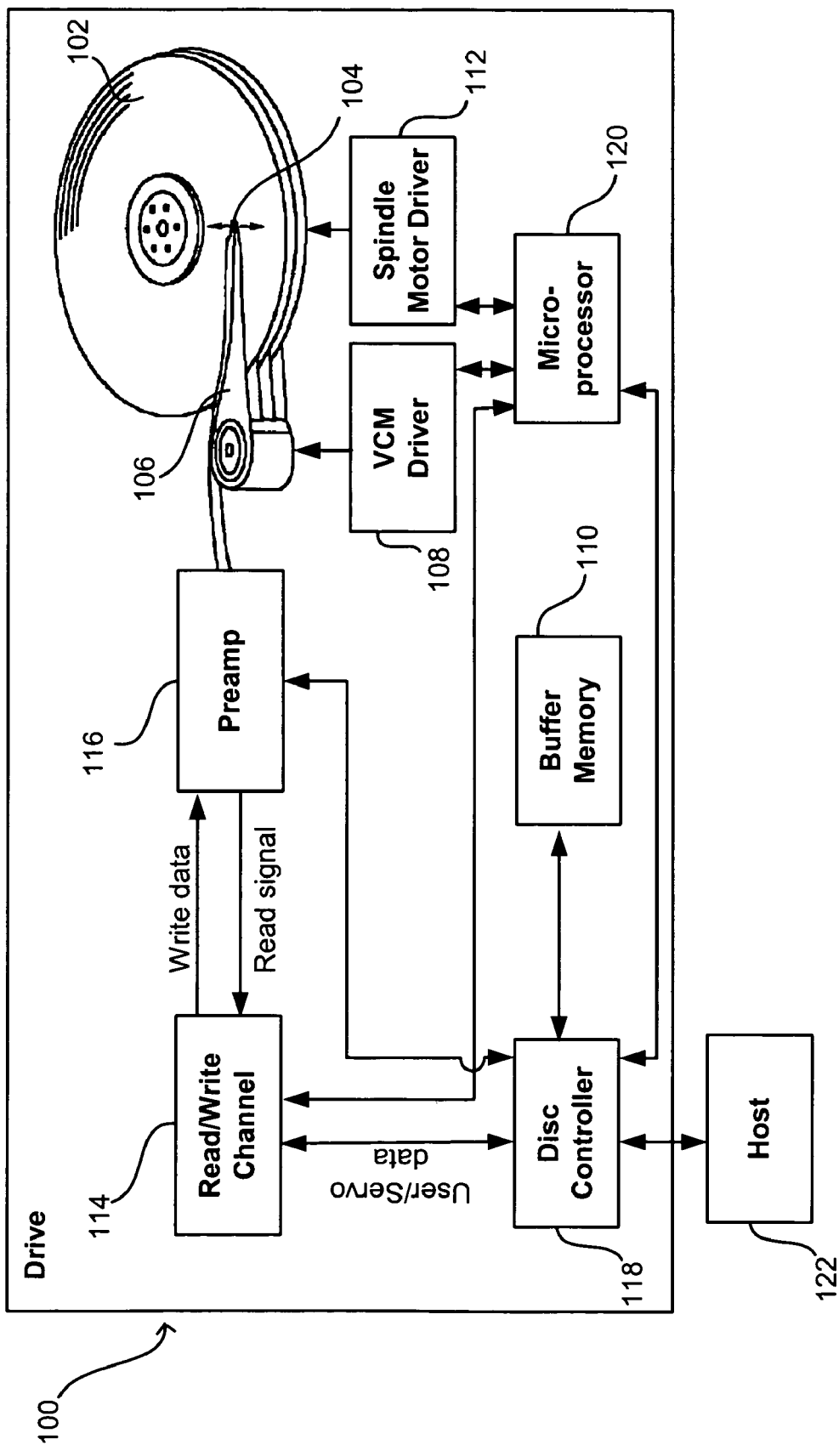
FIG. 1 is a diagram showing components of a disc drive that can be used in accordance with embodiments of the present invention.

Systems and methods in accordance with one embodiment of the present invention can be used when servowriting, or self-servowriting, a rotatable storage medium in a data storage device, such as a hard disk drive. For example, a typical disk drive 100, as shown in FIG. 1, includes at least one magnetic disk 102 capable of storing information on at least one of the surfaces of the disk. A closed-loop servo system can be used to move an actuator arm 106 and data head 104 over the surface of the disk, such that information can be written to, and read from, the surface of the disk. The closed-loop servo system can contain, for example, a voice coil motor driver 108 to drive current through a voice coil motor (not shown) in order to drive the actuator arm, a spindle motor driver 112 to drive current through a spindle motor (not shown) in order to rotate the disk(s), a microprocessor 120 to control the motors, and a disk controller 118 to transfer information between the microprocessor, buffer, read channel, and a host 122. A host can be any device, apparatus, or system capable of utilizing the data storage device, such as a personal computer or Web server. The drive can contain at least one processor, or microprocessor 120, that can process information for the disk controller 118, read/write channel 114, VCM driver 108, or spindle driver 112. The microprocessor can also include a servo controller, which can exist as an algorithm resident in the microprocessor 120. The disk controller 118, which can store information in buffer memory 110 resident in the drive, can also provide user data to a read/write channel 114, which can send data signals to a current amplifier or preamp 116 to be written to the disk(s) 102, and can send servo and/or user data signals back to the disk controller 118.

Figure 2:
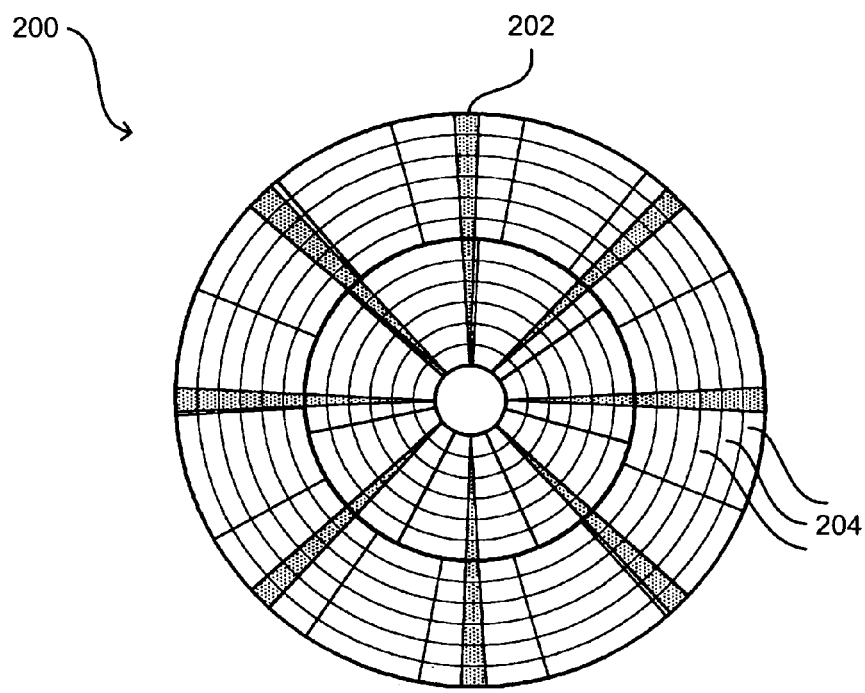
FIG. 2 is a diagram showing an example of a data and servo format for a disk in the drive of FIG. 1.

The information stored on such a disk can be written in concentric tracks, extending from near the inner diameter of the disk to near the outer diameter of the disk 200, as shown in the example disk of FIG. 2. In an embedded servo-type system, servo information can be written in servo wedges 202, and can be recorded on tracks 204 that can also contain data 206. In a system where the actuator arm rotates about a pivot point such as a bearing, the servo wedges may not extend linearly from the inner diameter (ID) of the disk to the outer diameter (OD), but may be curved slightly in order to adjust for the trajectory of the head as it sweeps across the disk.

The servo information often includes bursts of transitions called "servo bursts." The servo information can be positioned regularly about each track, such that when a data head reads the servo information, a relative position of the head can be determined that can be used by a servo processor to adjust the position of the head relative to the track. For each servo wedge, this relative position can be determined in one example as a function of the target location, a track number read from the servo wedge, and the amplitudes or phases of the bursts, or a subset of those bursts. The position of a head or element, such as a read/write head or element, relative to the center of a target track, will be referred to herein as a position-error signal (PES).

Figure 3:
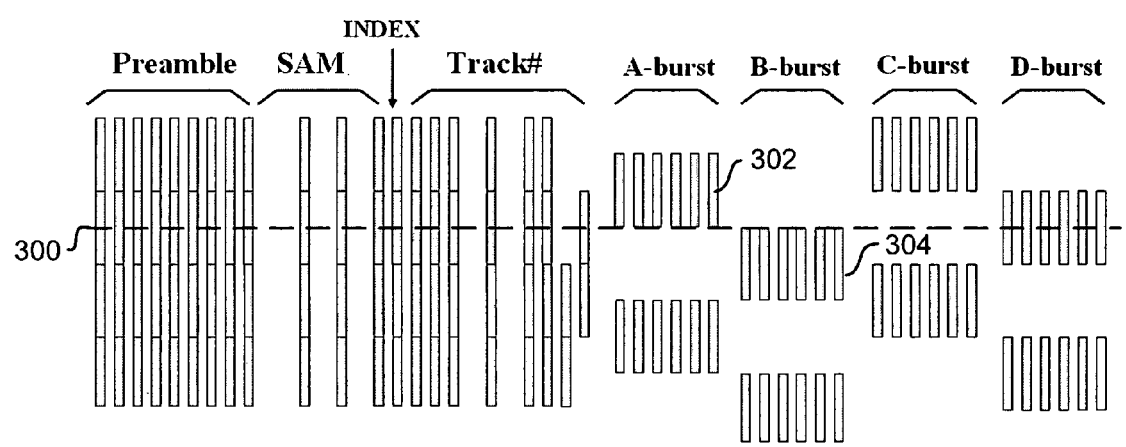
FIG. 3 is a diagram showing servo information that can be written to the tracks shown in FIG. 2.

For example, a centerline 300 for a given data track can be "defined" relative to a series of bursts, burst edges, or burst boundaries, such as a burst boundary defined by the lower edge of A-burst 302 and the upper edge of B-burst 304 in FIG. 3. The centerline can also be defined by, or offset relative to, any function or combination of bursts or burst patterns. This can include, for example, a location at which the PES value is a maximum, a minimum, or a fraction or percentage thereof. Any location relative to a function of the bursts can be selected to define track position. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero if the radial location defined by the A-burst/B-burst (A/B) combination, or A/B boundary, is the center of a data track, or a track centerline. In such an embodiment, the radial location at which the PES value is zero can be referred to as a null-point. Null-points can be used in each servo wedge to define a relative position of a track. If the head is too far towards the outer diameter of the disk, or above the centerline in FIG. 3, then there will be a greater contribution from the A-burst that results in a more "negative" PES. Using the negative PES, the servo controller could direct the voice coil motor to move the head toward the inner diameter of the disk and closer to its desired position relative to the centerline. This can be done for each set of burst edges defining the shape of that track about the disk.

The PES scheme described above is one of many possible schemes for combining the track number read from a servo wedge and the phases or amplitudes of the servo bursts. Many other schemes are possible that can benefit from embodiments in accordance with the present invention.

A problem that exists in the reading and writing of servo patterns involves the misplacement, or offset, of a read/write head with respect to the ideal and/or actual position of a track. It is impossible to perfectly position a head with respect to a track for each rotation of a disk, as there is almost always a noticeable offset between the desired position and the actual position of the head with respect to the disk. This can cause problems when writing servo patterns, as each portion of the pattern can be slightly misplaced. This can lead to what is referred to as written-in runout. Written-in runout can be thought of as the offset between the "actual" centerline, or desired radial center, of a track and the centerline that would be determined by a head reading the written servo pattern. Written-in runout can lead to servo performance problems, wasted space on a disk and, in a worst case, unrecoverable or irreparably damaged data.

Systems and methods in accordance with one embodiment of the present invention overcome deficiencies in prior art servowriting and self-servowriting systems by taking advantage of variable write currents. For example, the non-repeatable runout (NRRO) suffered by a read/write (R/W) head during self-servowriting operations can be written into the servo bursts. The written-in runout of a self-servowritten pattern can be reduced by varying the write-current used to write servo information, including servo bursts, as a function of the location of the write-element during servowriting.

As shown in FIG. 3, the radial position of a track 300 can be defined by the "lower" edge of one burst 302 and the "upper" edge of a corresponding burst 304 in a differential pair. Here, the "lower" edge can refer to the edge of the burst nearest the inner diameter (ID) of a disk, while the "upper" edge can refer to the edge nearest the outer diameter (OD) of the disk. The position of a center of a track can be determined by examining the boundary between these edges. Embodiments in accordance with the present invention can allow the track defined by such burst edges to have written-in runout that is less than the NRRO that the R/W head suffered while writing, to the extent that the NRRO is known at the time. The written track-width of the head can also be controlled, in order to behave as determined during calibration operations.

At each track to be self-servowritten, it can be desirable to remove the synchronous runout of the reference pattern as much as possible. Several techniques exist for removing synchronous runout that are known to those skilled in the art. After substantially removing the synchronous runout, each head should be following substantially circular tracks on the respective disks. The remaining runout of each head should then be dominated by non-synchronous runout suffered by the reference head, or the head observing the reference surface, from which the position of the head-stack is controlled. The head stack assembly (HSA) typically refers to the combination of the actuator, voice coil motor (VCM), E-block (arms of the actuator), suspensions, and heads. The HSA is typically one of two major moving parts of a drive, with the other moving part being the spindle and disks, referred to as the "disk-stack". There may be other contributors to the remaining runout for the R/W heads that is not common to that suffered by the reference head. Typically, these contributors will be relatively small.

Figure 4:
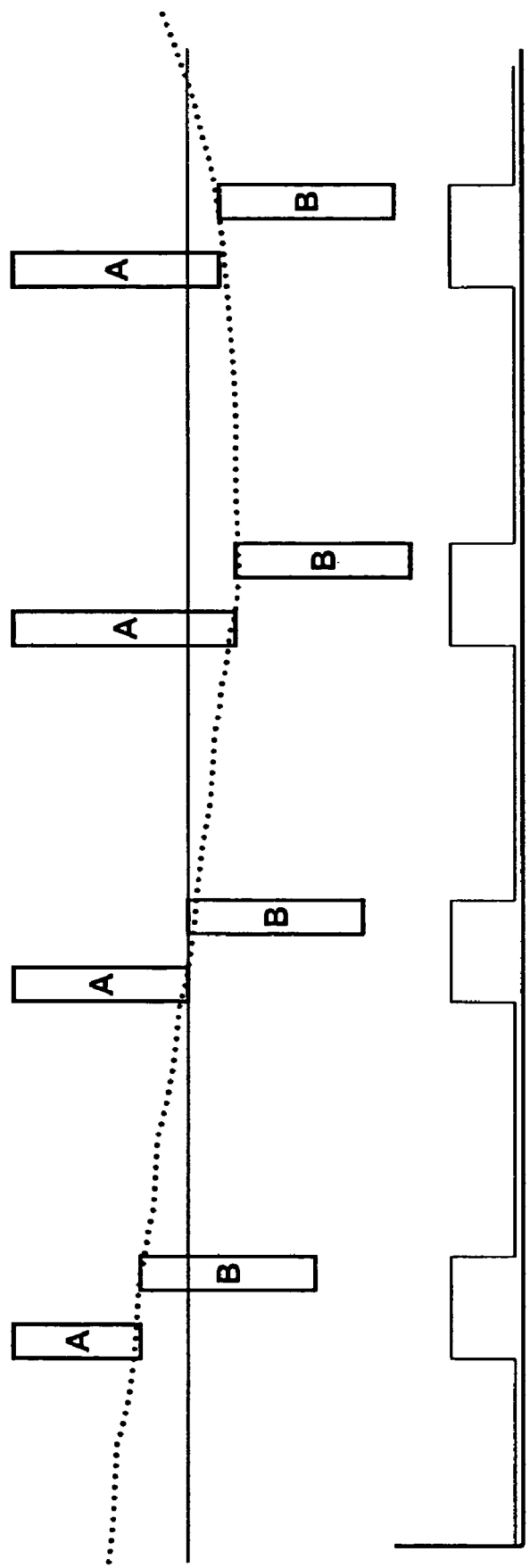
FIG. 4 is a diagram showing displacement of servo bursts that can be written to the tracks shown in FIG. 2.

FIG. 4 shows an example of a pattern wherein the remaining runout is dominated by non-synchronous runout suffered by the reference head. For simplicity sake, erase bands will be ignored as they do not significantly impact the discussion of various embodiments. In FIG. 4, during the servowriting step in which the A-bursts were written, the writer was approximately on track, such that the top edges of the A-bursts are in approximately the correct location. The dotted line shows the path of the upper edge of the write element of the head during the next servowriting step, in which the A-bursts are trimmed and the B-bursts are written. Notice that the misplacement of the head during the second servowriting step results in position errors for the lower edges of the majority of the A-bursts and the upper edges of the majority of the B-bursts. This can cause a subsequent read or write operation on the track defined by these bursts to misread data, as the head will be offtrack, or misplaced, during much of the read operation. At the bottom of FIG. 4 is the write current for the second servowriting step, showing a constant current for each burst, whether trimming or writing.

While the final servo wedges (reference 202 in FIG. 2) are being written for each head, the position measurements from the reference head, or a servo position signal, can indicate approximately how much each head is misplaced with respect to track center. For example, looking at FIG. 1, a signal from the head 104 reading the reference pattern can be passed as servo data through the read/write channel 114 to the disk controller 118, and passed on to the microprocessor 120, which can send commands to the VCM driver 108, in order to attempt to move the head back into position relative to the track. The measured PES can also be analyzed and used to determine an appropriate write current command which can be sent with the write data to the current preamp 116, in order to deliver a write current appropriate for the relative position of a head writing servo information. The position measurements from the reference pattern will probably be non-zero, primarily due to imperfect control of the servo position of the reference head, but can be used as a reference for lookup and possible interpolation. A lookup can be done using tables such as those described herein, in which head calibration information and position information can be stored in memory in the hard drive, and used to vary the write-current in order to account for mis-placement of the reference head.

Figure 5:
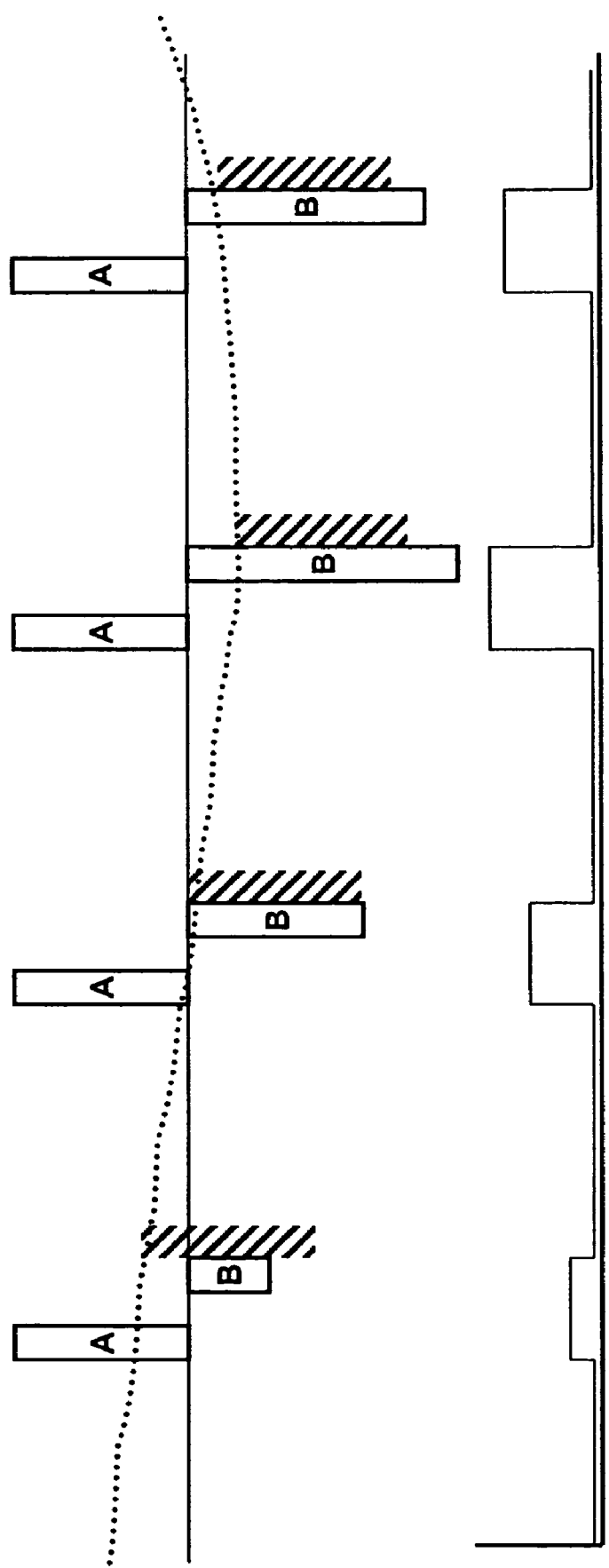
FIG. 5 is a diagram showing servo bursts written in accordance with one embodiment of the present invention.

For instance, as shown in FIG. 5, a series of A-bursts can be written on a first servowriting step. For simplicity's sake, it is assumed that all A-bursts are positioned correctly and extend below the desired centerline, such that they can be trimmed by a servowriting step that is performed with a correctly-positioned R/W head. In some embodiments, it can be essential that the writer width be at least a certain percentage of the overall track spacing, such as for example 75%, in order to ensure that the A-bursts extend below the desired centerline. The dotted line in the Figure shows the actual path of the upper edge of the write element of the R/W head during the servowriting step in which the B-bursts are written. The patterned areas show the width of the B-bursts without width variation, as shown in FIG. 4.

Figure 6:
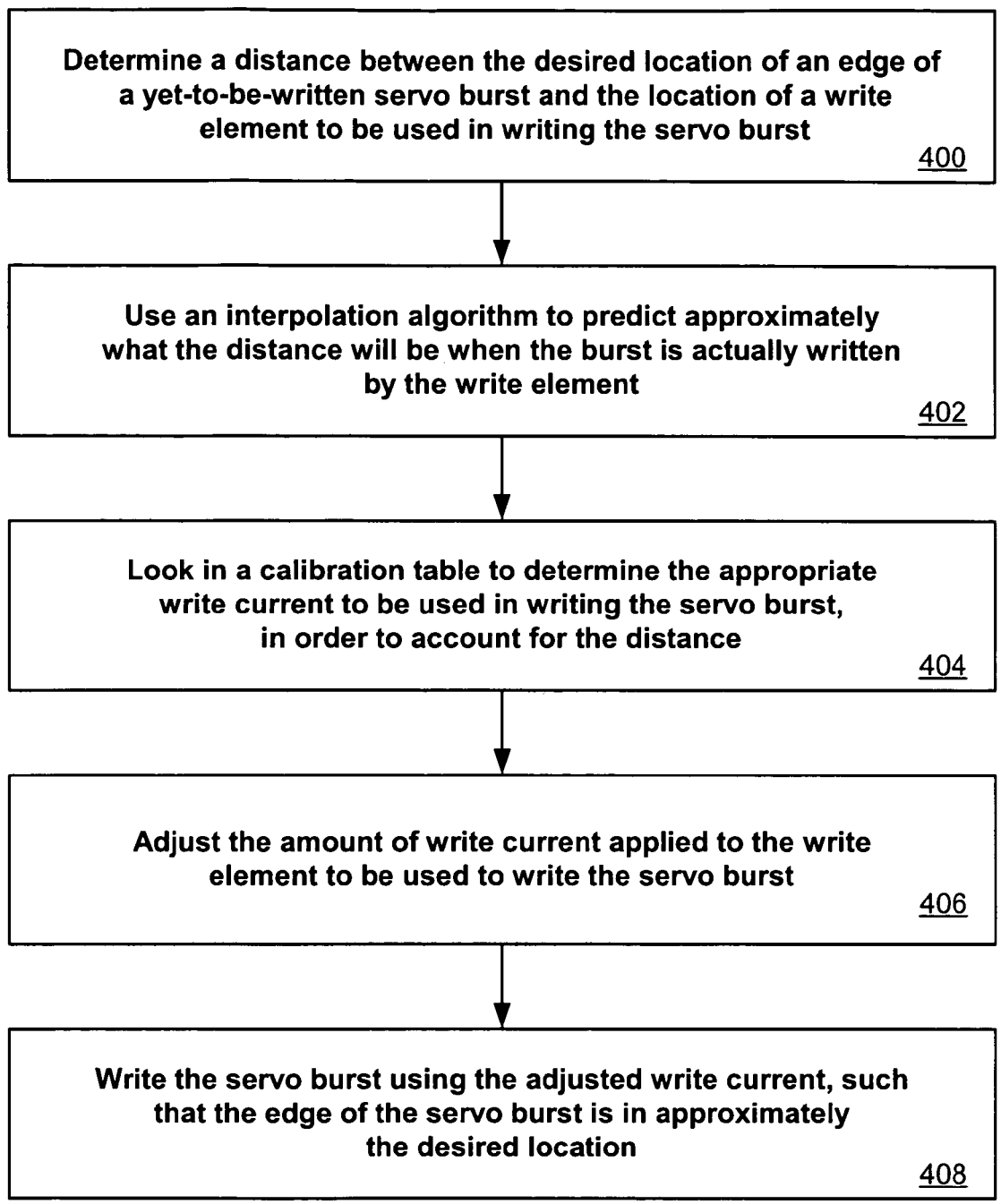
FIG. 6 is a flowchart showing a method that can be used in accordance with one embodiment of the present invention.

An exemplary method that can be used to account for the actual path of the upper edge of the write element, as shown in FIG. 5, is shown in the diagram of FIG. 6. Using servo position information, it is possible to determine the position of the head with respect to the track centerline. Once the position of the head is known, it is possible to determine the distance between the desired location of an edge of a yet-to-be written servo burst and a write element on the head 400. The distance can be calculated in a number of ways, such as from the edge of the to-be written burst to the center of the write element or to the appropriate edge of the write element. In some embodiments, an interpolation algorithm can be used to predict the position of the write element when the servo burst is actually written 402, as there will likely be some radial variation between the time that the reference pattern is read and the time that the servo pattern is written.

Figure 8:
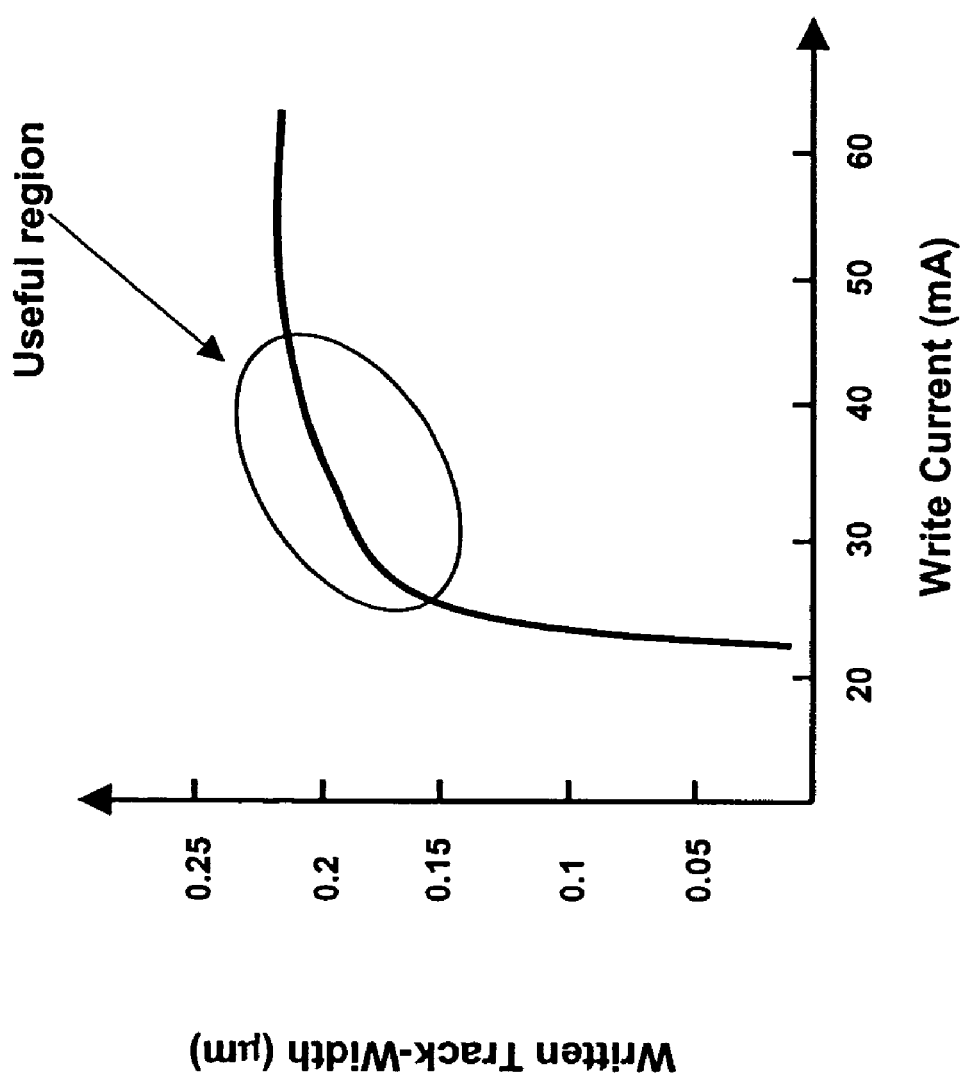
FIG. 8 is a plot showing the variation of burst width as a function of write-current for a head that can be used with the embodiment of FIG. 5.

The misplacement distance can be used, along with calibration information stored in the calibration table(s), to determine how much the write current should be adjusted in order to write a burst with an upper edge along the track centerline 404. The amount of write current can then be adjusted appropriately 406 and used to write the servo burst 408. As shown in FIG. 5, the write current can be varied such that the upper edge of each B-burst is approximately positioned along the desired centerline. The magnitude of the variation shown in FIG. 5 is exaggerated for purposes of clarity and understanding. Actual variation may only be on the order of about 10% of the nominal data track spacing. It is to be understood that practically the write current is adjusted between an upper and lower limit determined by the writing characteristics of the head as shown in FIG. 8. The upper limit exists when the write current does not give a usably wider burst. The lower limit exists when no usable burst can be written.

As can be seen from FIG. 5, a continually adjusting write current not only helps to ensure that the B-bursts are written with the top edge approximately along the desired centerline, but also can ensure that the bottom edge of each A-burst is trimmed approximately along the centerline. The variation in write current can therefore remove most, if not all, of the non-synchronous runout which would otherwise be written into the servo burst pattern. If the variation is small enough that the bottom edge of each B-burst extends below the next centerline, such that they will be trimmed by the next servowriting step that writes the A-bursts, for example, then the written pattern may show no effect of the path variation.

Adjustments to the write current can be determined using the position of the top edge of the write element of the R/W head with respect to the desired centerline. For example, the leftmost B-burst in FIG. 5 would be written with a top edge above the desired centerline if the standard write current were used. In order to move the top edge of this burst down to its desired position, the write current can be reduced appropriately using the calibration information. At the bottom of FIG. 5 are examples of write currents for each B-burst, with the second burst from the left having a nominal write current and burst width. As can be seen, the write current for the leftmost B-burst is less than the nominal value. The reduction in write current applied to the head causes the head to have a more narrow effective writing area. An increase in write current, as shown in the two right-most B-bursts, causes the head to have an increased effective writing area. How narrow or wide a burst can be written will vary with each write head, but can be a function of head width. There also may be a minimum write current below which bursts cannot effectively be written to, and read from, the media.

Time Delays

When writing servo information, the actual writing of the final servo information onto a disk does not occur simultaneously with the reading of the reference data, as it is necessary to read the information before it can be re-written. As such, there will be a delay in time between the reading and writing of the information. Because of this delay in time, the radial position of the head at the time of writing will not be exactly where it was when reading the servo information. It may then be necessary, depending on the length of the delay and/or the variation of the head path, to make at least one calculation to predict where the head will be when the data is written. For example, a state-estimator can be used to predict the position-error of the reference head at the time of writing from the estimated state variables at the time of the most recent sample, such as by using standard state-space techniques. Such techniques can take into account, for example, the radial velocity and direction of the R/W head and the rotation speed of the disk.

Calibration

Various calibration procedures can be used to calibrate a head, or any read or write element on such a head. A head can be calibrated in order to determine, for example, the width of a track written and/or erased by the head as a function of write current. The location of a write element, such as on a R/W head, can be determined by observing a reference pattern. Such reference patterns can include, but are not limited to, patterns written to one surface by a media-writer, printed-media patterns, and portions of final servo patterns written by the drive R/W head during an earlier portion of an ongoing self-servowriting operation. Calibrated quantities can vary from head to head, and from drive to drive. Write and erase widths can also vary, for example, as a function of radius and/or temperature, such that it may not be enough to simply calibrate a head by varying write current. If a drive or test-process setup does not include the capability to measure temperature, it may be necessary to operate with a relatively steady power-draw for long enough to attain a steady-state temperature. The calibrated write/erase width as a function of head-number, write-current, temperature, and radius can be recorded for later use. This information can be stored, for example, in memory resident in the drive or on the drive itself in a reserved location.

One such calibration process that can be used with embodiments of the present invention utilizes a DC-erase space in the data-area, between servo samples that are used to control the position of the R/W head during this test. A field can be written into this erased space that looks like a servo burst using a specific write-current ($I_0$). A "track-profile" of the burst can be measured, such as by scanning the R/W head radially across the written burst, measuring the burst amplitude as a function of radial position. The burst amplitude can be measured using whatever circuitry and technique the servo normally uses to demodulate servo bursts. The burst could be written immediately after the bursts normally used by the servo, and the servo demodulation circuitry could be re-programmed to demodulate the burst as if it were an extra servo burst. That burst value may not be used by the servo for controlling the position of a R/W head, but only for calibration purposes. The measured profile, which can be a function of the writer width, the write-current, the reader width, and radius, as well as possibly the media properties and temperature, will typically have a rising portion (as the reader approaches the written burst), a relatively flat portion (where the reader is entirely contained within the written burst), and a falling portion (where the reader is getting out from under the written burst).

These steps can then be repeated using a different write-current ($I_1$). If $I_1$ is larger than $I_0$, then the measured profile should be wider than the original profile. It is likely that the wider profile will have rising and falling portions that are essentially parallel to those of the original burst, but displaced in position. The difference in position of the rising and falling portions of the profile can be recorded as a function of the write current. A table can be constructed that associates the variation of the location of the edges of written bursts (i.e., the displacement of the rising or falling portion of the track profile) with write-current. This process can be repeated at several radial locations for each R/W head. Such a table can be used later during the self-servowriting process. The drive can use an interpolation scheme to determine the variation of burst-width with write-current using the data in the table.

Knowing the calibrated write/erase width as a function of write-current allows the drive to respond to measured (or estimated) position-errors of the head during self-servowriting operations by varying the write-current in response. For example, if the above measurements indicate that each extra milliamp of write-current extends the width of written bursts by 0.05 microns, and it is determined that the head will be too far toward the ID by 0.075 microns, then the write current can be increased beyond the nominal value by 3.0 milliamps, as 3.0 milliamps*0.05 microns/milliamp=0.150 micron increase in burst width, which can extend the upper and lower edges of the burst by 0.075 microns each, compensating for the effects of the 0.075 micron displacement of the head on the upper edge of the burst.

Not all of the heads will have the same runout relative to the disk surfaces upon which they write. Differences in runout can be caused by actuator tilt, for example, which can move different heads different distances relative to the disks. Differences can also be caused by non-common-mode spindle-runout since the spindle has two bearings and the disk-stack can tilt, which can result in the disks moving different amounts relative to the different heads, as well as by disk vibrations, which may or may not be correlated from head to head. It is possible that the servowritten pattern of heads other than the reference head may therefore suffer greater RRO than that of the reference head.

Interpolation can be used with a table that associates burst-width variation with write-current. The measurement of burst-width can be made at a number of discrete currents, with the results placed in a table. When the drive is writing final wedges, it can note the position-error of the reference head relative to the reference-track, and can try to compensate for that position-error by varying the current with which it writes final wedges. In order to determine the appropriate write-current, the drive can use the position-error as an input to an interpolation routine that finds the two offsets that bracket the desired burst-edge displacement. The two "offsets" between which interpolation is done can be two burst-widths in the table, and the "desired burst-edge displacement" is the position-error of the reference head. Using interpolation can allow a drive to rely on relatively few measurements of burst-width as a function of write-current.

As an example, calibrations could show a 40 mA write current resulting in a burst-width of 0.5 microns, 42 mA giving a burst width of 0.54 microns, and 38 mA giving a 0.46 micron burst-width. It could be concluded that, with a nominal write-current of 40 mA, the upper edge of a written burst moves 0.01 microns per mA change in write-current, with the burst-width increasing by 0.02 microns per mA of current-increase. If at some time the reference head is exactly ontrack, a write-current of 40 mA can be used. If the reference head is −0.005 microns offtrack (i.e., the reference head was 0.005 microns below the target location), a write-current of 40.5 mA can be used. This value can be obtained by interpolating between measurements made previously.

Figure 7:
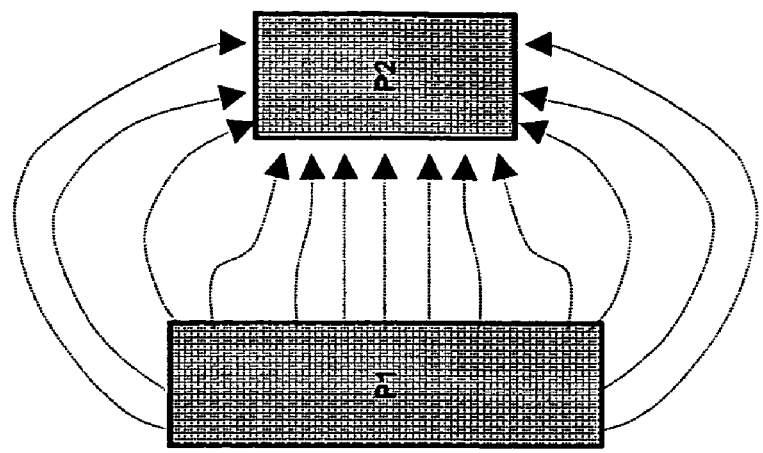
FIG. 7 is a diagram showing the variation of field lines with write current, which can be used in accordance with the embodiment of FIG. 5.
Figure 7:
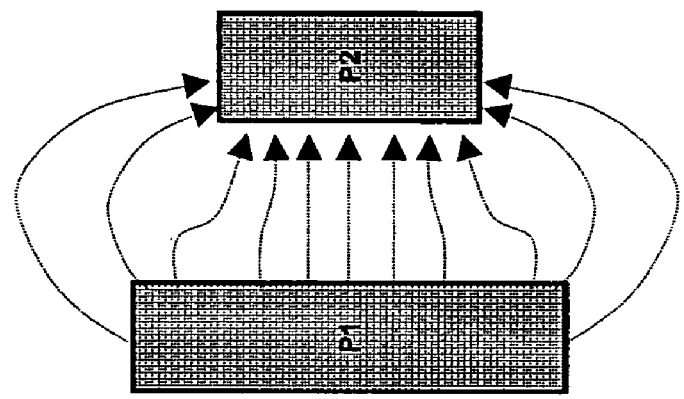
Figure 7:
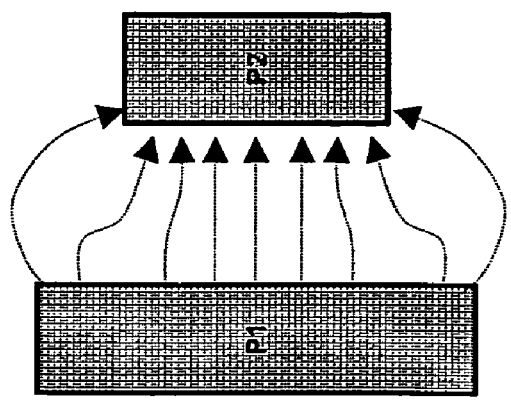

The illustrations in FIG. 7 are intended to show how the magnetic field lines change with write current. The Figure contains field line diagrams for three different write currents. At each current, the flux lines are shown passing from a first pole (P1) to a second pole (P2) of the read/write head. As shown in the figure, the shape of the field lines may not vary significantly with write current as long as the head is not saturated, only the magnitude of the flux lines. Even if saturation does occur to some extent, however, the written burst width can still rise monotonically with increasing write current. As such, there is a distance from the head at which the write field decays to a low enough level that it is no longer capable of writing to the media. As the write current is increased, the distance from the writer at which the field is large enough to write to the media increases as well. The width of the written bursts therefore can be seen to rise as a function of the write-current.

An illustrative plot of how that write-width can vary as a function of write current for a given head is shown in FIG. 8. In that figure, "written track width" is taken to be synonymous with "written burst width". As can be seen in this example, there is a value of current, around 45 mA, at which the write head is saturated. When the write head is fully saturated, the written track width can no longer be increased by an increase in current. There is also a value, around 25 mA in the example, below which the track width cannot change significantly. Once the current is set below this value, the current may no longer be sufficient to correctly write any useful information to the disk.

An alternative calibration scheme can be used to determine how the effective centerline of the servowritten track, as determined by the edges of the written bursts, varies with write current. The way in which the centerline of a written track varies with write current can be determined by servowriting a track with different write-currents and measuring the variation of the track-centerline with the write-current. This approach is illustrated in FIG. 9.

Figure 9:
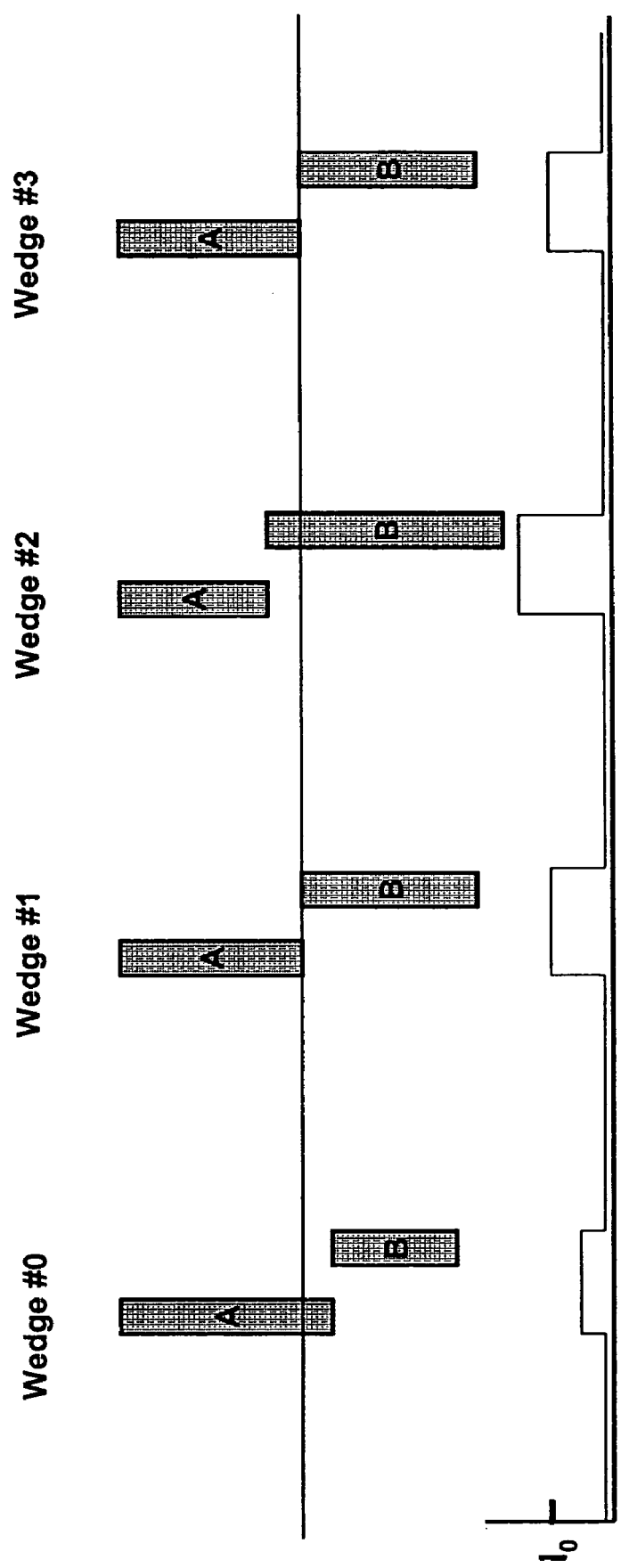
FIG. 9 is a diagram showing a burst pattern that can be used to calibrate a servowriting process in accordance with one embodiment of the present invention.

In FIG. 9, it is assumed for the sake of simplicity that writing with the nominal current would produce perfectly-aligned wedges. The write-current can then be intentionally varied from wedge to wedge, in a pre-determined fashion, to produce a repetitive mis-placement of bursts. For example, Wedge #0 in the figure is written with a smaller-than-nominal write current, such that the A-burst is trimmed below the track centerline and the upper edge of the B-burst is below the centerline. Wedge #1 and wedge #3 are written with nominal write currents, and wedge #2 is written with a larger-than-nominal write current, such that the A-burst is trimmed above the centerline and the top edge of the B-burst extends above the track centerline. The mis-placement of the bursts written for wedges 0 and 3 can be determined by servoing on the servowritten track and applying the RRO reduction techniques referred to above.

In fact, the burst-placement will be non-ideal for reasons other than the fact that servowriting is done with varying write-current. Even though an attempt can be made to remove the RRO of the original reference pattern before servowriting, the RRO might not get completely removed. Also, the NRRO that is being rejected by embodiments of the present invention can be present during the calibration and "contaminate" the results. The contamination due to RRO in the reference pattern, which is not completely removed by RRO reduction techniques, can be reduced by doing two processes at a time. In a first process, a uniform (nominal) write current can be used to write all wedges. In a second process, the write current can be varied from wedge to wedge in a pre-determined fashion. By comparing the results, or computed track centerline placement, of the two processes, the track centerline displacement can better be determined as a function of write current. In order to remove effects of NRRO on the calibration, the above process can be repeated several times. The results of these process repetitions can then be averaged in order to remove the effects of the random NRRO.

Although embodiments described herein refer generally to systems having a read/write head that can be used to write bursts on rotating magnetic media, other embodiments of the invention can take advantage of similar variation, such as variations in drive current or drive voltage. For example, a laser writing information to an optical media can be driven with variable power in order to increase or decrease pit width in the media in order to reduce track variation. Any media, or at least any rotating media, upon which information is written, placed, or stored, may be able to take advantage of embodiments of the invention, as variations in optical, electrical, magnetic, mechanical, and other physical systems can be made by varying a drive signal or other control mechanism in order to reduce track misplacement.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A system for improved servowriting, comprising:
a rotatable medium having at least one surface adapted to have information written thereon;
a write element adapted to write information on a surface of the rotatable medium;
a positioning mechanism adapted to position the write element relative to the rotatable medium; and
a write current controller adapted to adjust the write current applied to the write element in order to adjust the size of information written by the write element, the size being determined by the position of the write element relative to the rotatable medium.

2. A system according to claim 1, wherein:
the rotatable medium is selected from the group consisting of magnetic disks, optical disks, and laser-writable media.

3. A system according to claim 1, wherein:
the positioning mechanism includes a closed loop servo system adapted to move the write element relative to the rotatable medium.

4. A system according to claim 3, wherein:
the closed loop servo system contains at least one component selected from the group consisting of voice coil motors, spindle motors, servo controllers, and disk controllers.

5. A system according to claim 1, wherein:
the rotatable medium has concentric tracks written thereon, and the write element is adapted to write servo information and data on a common track on the rotatable medium.

6. A system according to claim 5, wherein:
the information written to the rotatable medium by the write element includes servo bursts positioned regularly about each track, such that when the write element, or any other element of the system, reads the servo information, a relative position can be determined that can be used by a servo processor to adjust the position of the element relative to the track.

7. A system according to claim 1, further comprising:
a reference pattern on a surface of the rotatable medium, the reference pattern used to position the write element and indicate information to be written by the write element.

8. A system according to claim 1, wherein:
a write current controller is adapted to continually adjust the write current throughout the write process.

9. A system according to claim 1, further comprising:
a calibration scheme adapted to be used with the write element and write current controller to calibrate the size of information written by the write element as a function of write current.

10. A system according to claim 9, further comprising:
a calibration table adapted to hold calibration data for the calibration scheme, wherein the calibration data can be used to determine the appropriate write current to be used in writing the information to the rotatable medium, in order to account for distance between the desired location of information to be written and the actual location of the write element.

11. A system according to claim 1, further comprising:
a first read element adapted to read data written by the write element.

12. A system according to claim 11, further comprising:
a read/write head containing the first read element and write element.

13. A system according to claim 1, further comprising:
a second read element adapted to read a reference pattern, the reference pattern to be used in writing information on the surface of the rotatable medium.

14. A system according to claim 13, further comprising:
a prediction scheme adapted to be used with the write element and write current controller to predict where the write element will be when the information, read by the second read element from the reference pattern, is written to the rotatable medium.

15. A system according to claim 1, further comprising:
a calibration scheme adapted to be used with the write element and write current controller to calibrate the size of information written by the write element as a function of temperature.

* * * * *